United States Patent [19]

Buschur et al.

[11] Patent Number: 4,798,102

[45] Date of Patent: Jan. 17, 1989

[54] CRANK ARM ASSEMBLY FOR WINDSHIELD WIPER DEVICE

[75] Inventors: Jeffrey J. Buschur, Beavercreek; David R. Paulick, Kettering; Roy C. Schoen, West Milton, all of Ohio

[73] Assignee: General Motors Corporation, Detroit, Mich.

[21] Appl. No.: 52,478

[22] Filed: May 21, 1987

[51] Int. Cl.[4] .......... B60S 1/24

[52] U.S. Cl. .......... 74/600; 15/250.16

[58] Field of Search .......... 74/600; 15/250.16, 250.17

[56] References Cited

U.S. PATENT DOCUMENTS

| | | | |
|---|---|---|---|
| 3,665,772 | 5/1972 | Beard et al. | 74/75 |
| 3,716,887 | 2/1977 | Bellware | 15/250.17 |
| 3,717,048 | 2/1973 | Carpenter | 74/600 |
| 4,028,950 | 6/1977 | Osterday | 74/70 |
| 4,400,844 | 8/1983 | Hayakawa et al. | 15/260.16 |
| 4,454,626 | 6/1984 | Schmidt et al. | 15/260.16 |
| 4,494,421 | 1/1985 | Matuoka | 74/600 |

*Primary Examiner*—Lawrence Staab

*Attorney, Agent, or Firm*—Saul Schwartz

[57] ABSTRACT

A reverse-to-park windshield wiper crank arm assembly. The assembly includes a hub on the wiper motor shaft, a control member around and rotatable relative to the hub, an intermediate link having one end pivotally connected to a crank pin on the hub and including a slot which slidably receives a guide pin on the control member, a drive lug on the hub engageable on the side of the intermediate link and a coil torsion brake spring disposed in an annular space between the hub and a surrounding inner wall of the motor housing. When the hub rotates in one direction corresponding to normal windshield wiping, the intermediate link is captured in a folded position and rotates as a unit with the hub while a tang on the hub engages a first hook-like formation on one end of the brake spring and flexes the springs to flexed conditions. Whe the hub reverses direction, the tang releases the brake spring which thereupon unflexes against the inner wall to immobilize the spring and the control member so that the hub, during continued rotation in the reverse direction, strokes the intermediate link from the folded position to an unfolded position corresponding to a parked position of the windshield wiper arms.

3 Claims, 2 Drawing Sheets

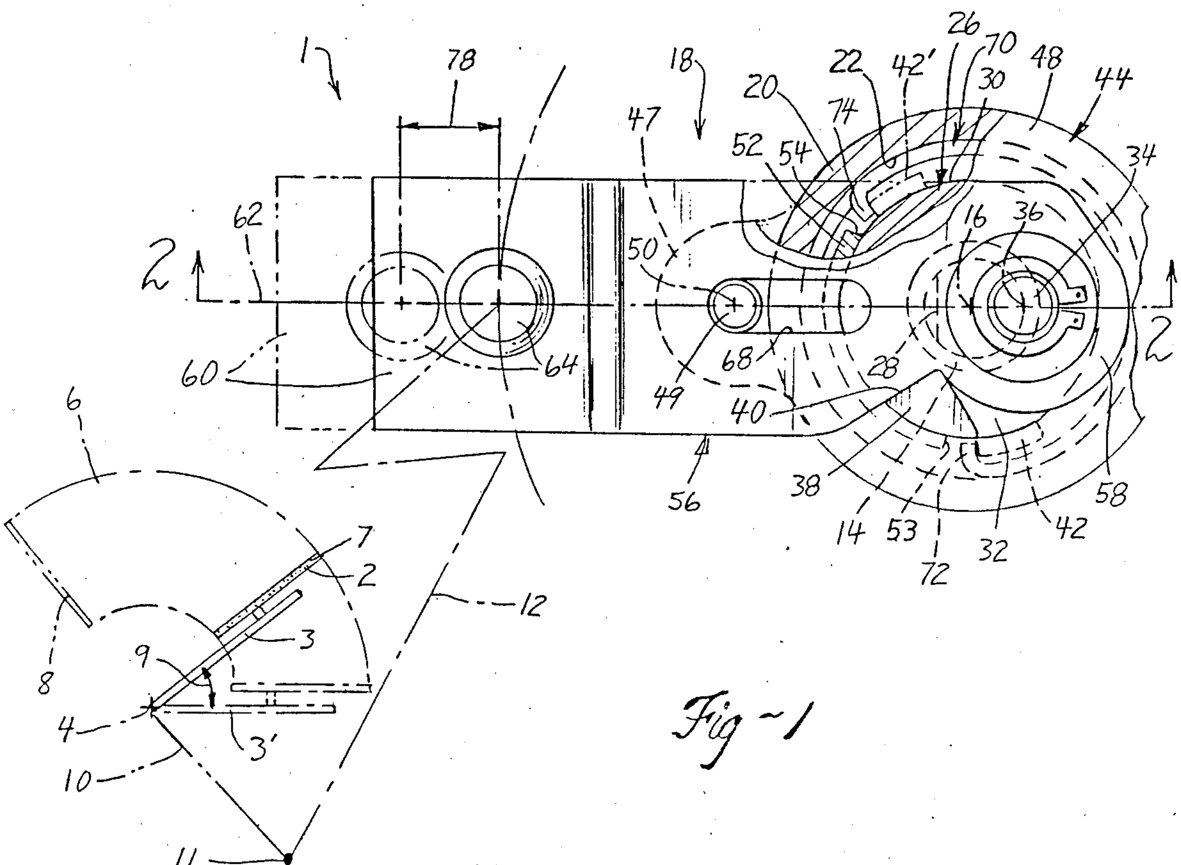
Fig~1
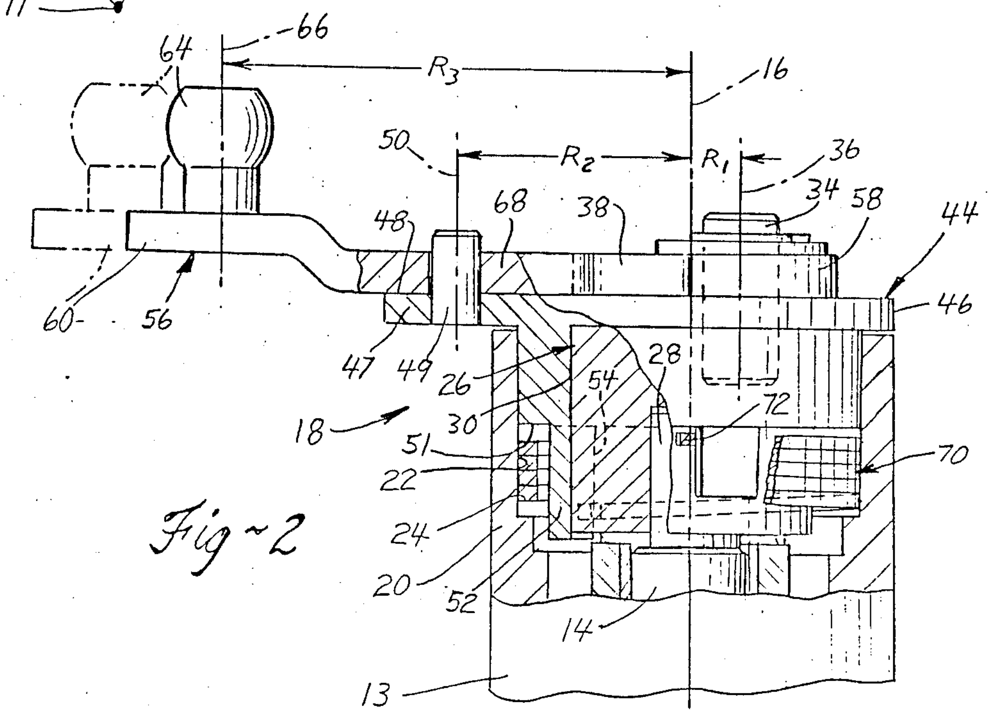
Fig~2

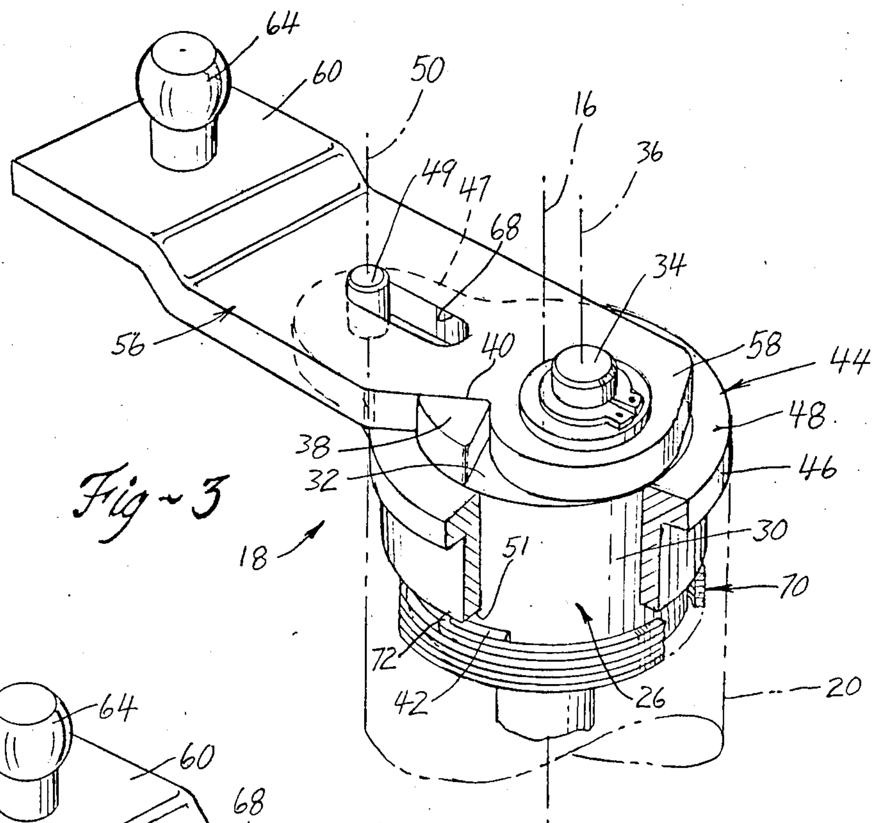
Fig~3
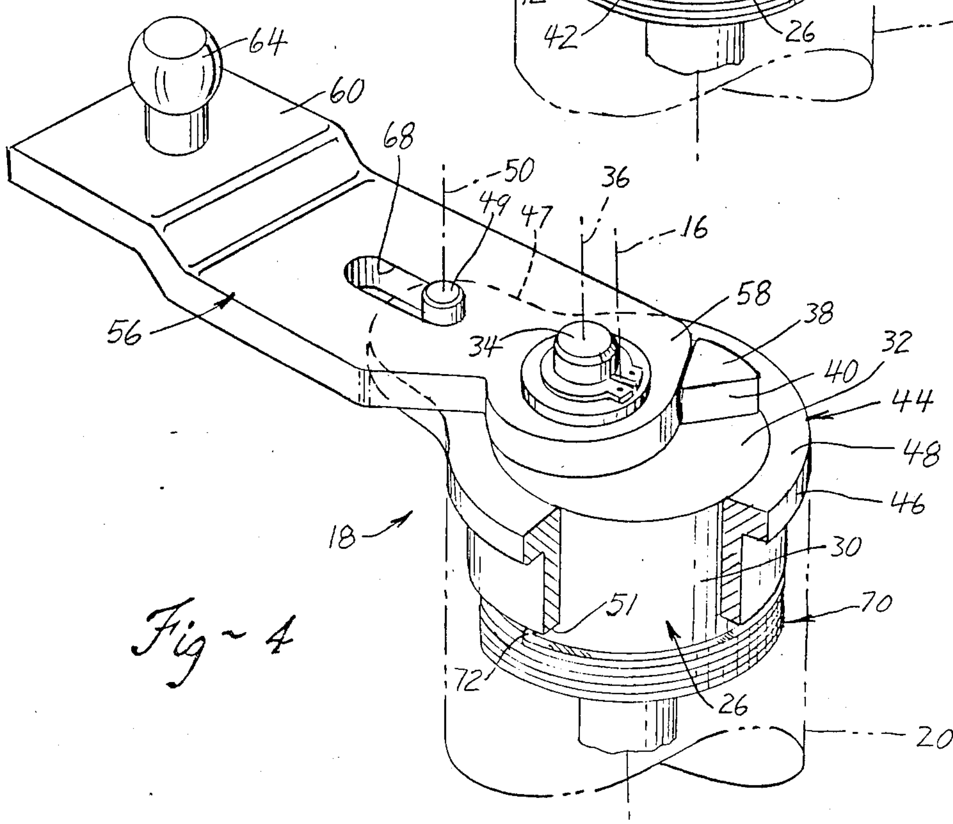
Fig~4

CRANK ARM ASSEMBLY FOR WINDSHIELD WIPER DEVICE

BACKGROUND OF THE INVENTION

1. Field of the Invention

This invention relates generally to automotive windshield wiper systems and, more particularly, to a crank arm assembly between a wiper drive motor and a transmission link of the windshield wiper system.

2. Description of the Prior Art

Typical automotive windshield wiper systems include a drive link connected to the wiper arms and extending across the vehicle, an electric motor, and a crank arm attached to the armature shaft of the motor and to one end of the drive link. When the motor shaft rotates, the drive link reciprocates in strokes determined primarily by the length of the crank arm which reciprocation causes the wiper arms to angularly oscillate between the inner and outer limits of their normal wiping arcs. In depressed park systems, the wiper arms are driven to stowed or parked positions below the inner limits of their normal wiping arcs at the end of the final wiping stroke. In so called reverse-to-park depressed systems, the extra angular movement of the wiper arms beyond their inner wipe limits is the result mechanism in the wiper drive system which automatically increases the effective length of the crank arm in response to the onset of reverse rotation of the wiper motor shaft. In one such system, an eccentric bushing is arranged between the outboard end of the crank arm and the corresponding end of the drive link. The bushing maintains a folded position when the motor shaft rotates in one direction corresponding to normal wiping of the windshield and automatically pivots to an unfolded position when the direction of motor shaft rotation reverses. In another reverse-to-park system, a fixed length crank arm on the motor shaft carries a crank pin which rotates in a fixed orbit around the motor shaft. An intermediate link has one end pivotally connected to the crank pin and the other end pivotally connected to the windshield wiper drive link. A control member is freely rotatable in one direction about the motor shaft axis but is prevented from rotating in the opposite direction by a one-way bearing. The control member defines a guide for the end of the intermediate link where the latter is attached to the drive link. When the motor shaft rotates in the direction corresponding to normal windshield wiping, the crank arm engages a stop on the control member and the latter rotates as a unit with the crank arm in a folded configuration of the assembly. At the onset of motor shaft rotation in the opposite direction, the one-way bearing prevents corresponding rotation of the control member so that the succeeding increments of angular movement of the crank arm relative to the control member effect linear outward displacement of the end of the intermediate link where the latter is attached to the drive link which linear movement increases the effective length of the crank arm assembly to park the wiper arms below the normal wiping arc. A crank arm assembly according to this invention represents a novel alternative to the just described reverse-to-park crank arm assembly.

SUMMARY OF THE INVENTION

This invention is a new and improved reverse-to-park crank arm assembly for automotive windshield wiper systems. The new and improved crank arm assembly includes a hub rotatable as a unit with the motor shaft, a crank pin on the hub, an intermediate link having one end pivotally connected to the crank pin and the other end pivotally connected to the wiper drive link and a short guide slot on a lengthwise axis of the intermediate link between the ends, an annular control member disposed around the hub and carrying a guide pin slidably received in the guide slot of the intermediate link, and a drive lug on the hub engageable on the side of the intermediate link. When the motor shaft rotates in one direction corresponding to normal windshield wiping, the hub rotates relative to the intermediate link until the drive lug engages the latter in a folded position of the intermediate link relative to the hub. The intermediate link is captured between the drive lug and the crank pin and rotates as a unit with the hub in the one direction. A coil torsion brake spring of the crank arm assembly is disposed in an annular space or chamber between the hub and an inner cylindrical wall of the motor housing. The brake spring has an unflexed diameter exceeding the diameter of the inner cylindrical wall so that the spring is frictionally locked to the inner cylindrical wall when unflexed. The brake spring has angularly spaced hook-like formations at opposite ends between which is disposed a skirt of the control member. When the spring is unflexed, the skirt is captured between the hook-like formations and the control member is immobilized. When the hub rotates in the one direction, a tang on the hub engages one of the hook-like formations and flexes the spring to free the latter from the inner cylindrical wall so that the brake spring and the control member are rotatable as a unit with the hub. At the onset of hub rotation in the opposite direction, the tang separates from the hook-like formation to allow the brake spring to unflex against the inner cylindrical wall and immobilize the control member. The hub then rotates in the opposite direction through an included angle of about 180 degrees to shift the intermediate link to its unfolded position.

BRIEF DESCRIPTION OF THE DRAWINGS

FIG. 1 is a partially schematic plan view an automotive windshield wiper system including a crank arm assembly according to this invention;

FIG. 2 is a partially broken away view taken generally along the plane indicated by lines 2—2 in FIG. 1;

FIG. 3 is a perspective view of the crank arm assembly according to this invention showing the intermediate link in the folded position relative to the hub; and FIG. 4 is similar to FIG. 3 but showing the intermediate link in the unfolded position relative to the hub.

Referring now to FIG. 1 of the drawings, a schematically illustrated automotive windshield wiper system 1 includes a wiper blade 2 attached to the distal end of a wiper arm 3 supported on a vehicle body for pivotal movement about an axis 4 of the body. During normal wiping operation, the wiper arm 3 angularly oscillates in a wiping arc 6 having an inner wipe limit 7 and an outer wipe limit 8. When not in use, the wiper arm 3 assumes a depressed parked position 3' below the wiping arc 6 angularly spaced from the inner wipe limit 7 by an angle 9. The angle 9 is illustrated in exaggerated fashion in FIG. 1 for clarity. A crank arm 10 is rigidly connected to and oscillates as a unit with the wiper arm 3. The distal end of the crank arm 10 is pivotally connected at 11 to one end of a schematically illustrated wiper drive link 12 which typically extends across the vehicle body. A drive motor 13, partially illustrated in FIG. 2, is supported on the vehicle body and includes an armature shaft 14 rotatable in opposite directions about a main axis 16 of the motor. A crank arm assembly 18 according to this invention is disposed between the motor shaft 14 and the end of the wiper drive link 12 opposite the pivot connection 11.

Referring now to FIGS. 1 and 2 of the drawings, the partially illustrated electric motor 13 further includes a stationary housing having an annular neck portion 20. The annular neck portion 20 has an inner cylindrical wall 22 which forms part of the crank arm assembly 18 and which is centered on the main axis 16. The inner cylindrical wall 22 terminates within the neck portion 20 at an annular shoulder 24.

The motor shaft 14 projects into the neck portion 20 and receives thereover within the neck portion a cylindrical hub 26 of the crank arm assembly 18. A flattened "D" section 28, FIGS. 1 and 2, on the end of the motor shaft is received in a corresponding bore in the hub whereby the hub is attached to the shaft for rotation as a unit therewith about main axis 16. The hub 26 has a cylindrical outer wall 30 centered on the main axis 16 and a circular end wall 32 disposed in a plane perpendicular to the main axis 16. A crank pin 34 projects rigidly from the hub 26 perpendicular to the circular end wall 32. The crank pin is centered on an axis 36 parallel to the main axis 16 and spaced laterally therefrom by a radial distance $R_1$, FIG. 2. The crank pin 34 traverses an inner circular orbit about the main axis 16 when the motor shaft rotates. A drive lug 38 having a contact edge 40 thereon projects rigidly from the circular end wall 32 of the hub 26 at a predetermined angular interval from the crank pin 34. A tang 42, FIGS. 1-3, near the bottom of the hub, projects from the outer wall 30 of the hub into the annular chamber defined between the outer wall 30 and the inner cylindrical wall 22 on the neck portion of the motor housing.

The crank arm assembly 18 further includes a control member 44 in the form of a cylindrical collar rotatably journaled on the cylindrical outer wall 30 of the hub within the neck portion 20. The control member 44 has a flange 46 at one end including an offset arm portion 47 and a top surface 48 parallel to the circular end wall 32 of the hub. A guide pin 49 projects rigidly from the offset arm portion 47 perpendicular to the top surface 48 and is centered on an axis 50 parallel to the main axis 16 and laterally displaced therefrom by a second radial distance $R_2$, FIG. 2. The control member 44 has an annular lower face 51 extending therearound above the tang 42 on the hub 26 in a plane parallel to the top surface 48. A relatively thin arcuate skirt 52 of the control member 44 projects down from the lower face 51 in close proximity to the outer wall 30 of the hub 26. As seen best in FIG. 1, the skirt 52 is bounded on one end by a first vertical edge 53 and on the other end by a second vertical edge 54. The control member 44 is freely rotatable relative to the hub 26 and the guide pin 49 traverses an intermediate circular orbit around the main axis 16 during such rotation.

An elongated, generally flat intermediate link 56 has an inboard end 58, an outboard end 60 and a lengthwise axis 62, FIG. 1, extending between the inboard and outboard ends. A link ball 64 is rigidly attached to the intermediate link 56 adjacent the outboard end 60 thereof and is centered on an axis 66, FIG. 2, perpendicular to the intermediate link. The link ball 64 provides a pivot connection at the axis 66 between the intermediate link 56 and the drive link 12. The intermediate link 56 includes a short guide slot 68 having a width corresponding generally to the diameter of the guide pin 49 and centered on the lengthwise axis 62. The intermediate link further includes a circular aperture adjacent the inboard end 58 which rotatably receives the crank pin 34 whereby the intermediate link 56 at the inboard end thereof is pivotally connected to the crank pin. In addition, the guide pin 49 is slidably received in the guide slot 68 thereby defining a sliding pivot fulcrum between the control member 44 and the intermediate link.

The crank arm assembly 18 further includes a brake in the form of a coil torsion brake spring 70 disposed below the lower face 51 of the control member in the annular chamber between the inner cylindrical wall 22 on the motor housing and the outer cylindrical wall 30 on the hub. The spring 70 surrounds the skirt 52 of the control member projecting down from the lower face 51. The spring 70 has an outside diameter exceeding the diameter of the inner wall 20 when the spring is unflexed so that in its unflexed condition the spring is frictionally locked to the wall 20 and thus immobilized. The spring has a first hook-like formation 72 at one end, FIGS. 1, 3 and 4, and a second hool-like formation 74, FIG. 1, at the other end angularly spaced from the first formation 72. The skirt 52 is disposed between the hook-like formations 72 and 74 with the formation 72 being adjacent the vertical edge 53 of the skirt and the formation 74 being adjacent the vertical edge 54 of the skirt.

The crank arm assembly 18 according to this invention operates as follows. The motor shaft rotates clockwise, FIGS. 1, 3 and 4, during normal windshield wiping. The hub 26 is free to rotate clockwise, FIG. 1, relative to the intermediate link 56 until the contact edge 40 of the drive lug 38 engages the side of the intermediate link. Thereafter, the intermediate link is captured between the drive lug and the crank pin so that further clockwise rotation of the hub is accompanied by clockwise rotation of the intermediate link as a unit therewith. The angular interval about the axis 16 between the crank pin 34 and the drive lug 38 is calculated to effect the aforesaid capture of the intermediate link in a folded position of the latter relative to the hub 26, FIGS. 1, 2 and 3, defined by linear alignment of the three axes 16, 36 and 66 with the axes 36 and 66 on opposite sides of the main axis 16.

Just before the contact edge 40 of the drive lug 38 reaches the side of the intermediate link 56, the tang 42 on the hub engages the first hook-like formation 72 on the brake spring 70. Then, as the hub continues to rotate clockwise until the contact edge 40 abuts the side of the intermediate link, the brake spring is torsionally flexed to an outside diameter smaller than the diameter of the inner wall 22. With the spring thus disconnected from the inner wall 22, the hub drives the intermediate link 56 around the main axis 16 and carries with it the control member 44 and the brake spring 70. Concurrently, the link ball 64 traverses an outside circular orbit of radius $R_3$ calculated to reciprocate the drive link 12 through a stroke which pivots the wiper arm 3 between the inner and outer limits 7 and 8, respectively, of the wiping arc 6.

When it is desired to terminate the wiping operation of the wiper arm 3, conventional motor control means, not shown, are manually actuated to initiate reversal of the direction of rotation of the motor shaft 14 substantially at the instant the wiper arm 3 next reaches the inner wipe limit 7. At the onset of reverse, counterclockwise rotation of the motor shaft 14 and the hub 26 about the axis 16, the drive lug 38 separates from the intermediate link 56 and the tang 42 separates from the hook-like formation 72 on the end of the spring 70. The spring 70 then torsionally unflexes into frictional engagement against the cylindrical wall 22 on the neck portion 20 of the motor housing. The spring 70 is then immobilized with the skirt 52 of the control member 44 captured between the hook-like formations 72 and 74 so that the control member is likewise immobilized.

The motor control maintains current flow to the motor for a time duration sufficient to rotate the motor shaft 14 counterclockwise through an included angle of about 180 degrees from its position at the onset of reverse rotation. With the control member 44 is immobilized by the brake spring 70, the crank pin 34 orbits approximately 180 degrees counterclockwise in its inner circular orbit during which movement the intermediate link 56 both rocks about the sliding fulcrum defined by the guide pin 49 and translates radially outward relative to the main axis 16. The intermediate link 56 achieves an unfolded position, FIG. 4, at about the instant the motor is switched off after 180 degrees of reverse rotation, the unfolded position being defined by linear alignment of the axes 16, 36 and 66 with the axes 36 and 66 on the same side of the main axis 16. During movement of the intermediate link from the folded to the unfolded position, the link ball 64 moves radially out relative to the main axis 16 through a park stroke 78, FIG. 1, thereby increasing the effective length of the intermediate link and causing the wiper arm 3 to move from the inner wipe limit 7 to the depressed parked position 3'. Concurrently, the tang 42 rotates with the hub 26 inside the stationary brake springs from its initial position near the hook-like formation 72 to a final position 42', FIG. 1, adjacent the other hook-like formation 74.

To subsequently initiate windshield wiping operation, the motor is switched on to rotate the motor shaft 14 clockwise. The brake spring 70 maintains the control member 44 stationary as the crank pin 34 retraces its previously final 180 degrees of orbital movement in the inner circular orbit. The intermediate link is concurrently withdrawn from the unfolded position to the folded position. As the intermediate link approaches the folded position, the tang 42 reengages the hook-like formation 72 on the spring 70 to torsionally flex the spring away from the inner wall 22 just as the contact edge 40 on the drive lug engages the side of the intermediate link. Thereafter, the intermediate link rotates clockwise as a unit with the hub as described hereinbefore.

The embodiments of the invention in which an exclusive property or privilege is claimed are defined as follows:

1. In combination with an electric motor including a motor shaft supported on a housing of said motor for rotation in opposite first and second directions about a main axis of said motor, a crank arm assembly comprising:

means defining a crank pin rotatable as a unit with said motor shaft in a circular inside orbit around said main axis, a control member supported on said housing for rotation about said main axis independently of said motor shaft, an intermediate link disposed in a plane perpendicular to said main axis and pivotally connected at one end to said crank pin and including a link ball rigidly connected thereto at the other end, means on said intermediate link and on said control member defining a slidable pivot fulcrum therebetween located between said ends of said intermediate link, said intermediate link having a folded position relative to said motor shaft defined by linear alignment of said link ball and said crank pin and said main axis with said link ball and said crank pin on opposite sides of said main axis, said intermediate link having an unfolded position relative to said motor shaft defined by linear alignment of said link ball and said crank pin and said main axis with said link ball and said crank pin on the same side of said main axis, said crank pin being operative when said control member is immobilized relative to said housing and in response to rotation of said motor shaft in either of said first and said second directions through substantially 180 degrees to move said intermediate link between said folded and said unfolded positions, means defining a drive lug rotatable as a unit with said crank pin and engageable on said intermediate link in said folded position of said intermediate link when said motor shaft rotates in said first direction whereby said intermediate link is captured between said crank pin and said drive lug and rotated as a unit with said drive lug and said crank pin about said main axis so that said link ball traverses a circular outside orbit around said main axis, means on said motor housing defining an inner cylindrical wall centered around said main axis, hub means on said motor shaft defining an outer cylindrical wall centered on said main axis and rotatable as a unit with said motor shaft, said inner and said outer cylindrical walls defining an annular space therebetween centered around said main axis, a coil torsion spring disposed in said annular space and including a first hook-like formation at one end and a second hook-like formation at the other end angularly spaced from said first hook-like formation, said spring having an unflexed condition frictionally engaging said inner cylindrical wall and a flexed condition remote from said inner cylindrical wall, means defining a skirt on said control member disposed between said first and said second hook-like formations, and means on said hub means defining a tang engageable on said first hook-like formation of said spring when said motor shaft rotates in said first direction and operative to torsionally flex said spring to said flexed condition and separable from said first hook-like formation at the onset of rotation of said motor shaft in said second direction so that said spring torsionally unflexes to said unflexed condition and thereby immobilizes said control member by capturing said skirt between said first and said second hook-like formations.

2. The crank arm assembly recited in claim 1 wherein said means on said intermediate link and on said control member defining a slidable pivot fulcrum therebetween located between said ends of said intermediate link includes a guide slot in one of said intermediate link and said control member, and a guide pin on the other of said intermediate link and said control member slidably and pivotally received in said guide slot.

3. The crank arm assembly recited in claim 2 wherein said guide slot is in said intermediate link and said guide pin is on said control member.

* * * * *